US011843639B2

(12) United States Patent
Guo

(10) Patent No.: US 11,843,639 B2
(45) Date of Patent: Dec. 12, 2023

(54) INDUSTRIAL CONTROL SYSTEM SECURITY ANALYSIS METHOD AND APPARATUS

(71) Applicant: Siemens Ltd., China, Beijing (CN)

(72) Inventor: Dai Fei Guo, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 17/927,930

(22) PCT Filed: May 29, 2020

(86) PCT No.: PCT/CN2020/093522
§ 371 (c)(1),
(2) Date: Nov. 28, 2022

(87) PCT Pub. No.: WO2021/237739
PCT Pub. Date: Dec. 2, 2021

(65) Prior Publication Data
US 2023/0199029 A1    Jun. 22, 2023

(51) Int. Cl.
*H04L 9/40* (2022.01)
(52) U.S. Cl.
CPC .......... *H04L 63/20* (2013.01); *H04L 63/1408* (2013.01)
(58) Field of Classification Search
CPC ..................... H04L 63/20; H04L 63/1408
(Continued)

(56) References Cited

U.S. PATENT DOCUMENTS

| 8,769,674 B2 * | 7/2014 | Repasi | H04L 51/212 |
| | | | 726/22 |
| 2007/0220607 A1 * | 9/2007 | Sprosts | H04L 63/123 |
| | | | 726/24 |

(Continued)

FOREIGN PATENT DOCUMENTS

| CN | 110661761 | 1/2020 | ............. H04L 29/06 |
| CN | 110896386 | 3/2020 | ............. H04L 29/06 |
| WO | 2019 034041 | 1/2019 | ............... G07G 1/14 |

OTHER PUBLICATIONS

English translation of International Search Report, International Application No. PCT/CN2020/093522, 11 pages, dated Feb. 24, 2021.

(Continued)

*Primary Examiner* — Anthony D Brown
(74) *Attorney, Agent, or Firm* — Slayden Grubert Beard PLLC

(57) ABSTRACT

Various embodiments include an industrial control system security analysis method. The method may include: collecting a communication data packet of interactive data transmitted between control devices in a first industrial control system; extracting network identifiable information; and determining whether it matches a pre-created event database. If the information matches: determining that the communication data packet is a malicious data packet; acquiring security policies of the first industrial control system and a second industrial control system; and determining a threat coefficient of the communication data packet for the second industrial control system based on the network identifiable information and each of the security policies, wherein the threat coefficient represents a degree of threat of the communication data packet to the second industrial control system.

6 Claims, 9 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2012/0198553 A1* | 8/2012 | Suginaka | G06F 21/565 |
| | | | 726/22 |
| 2013/0104236 A1 | 4/2013 | Ray | 726/25 |
| 2017/0230410 A1 | 8/2017 | Hassanzadeh | H04L 29/06 |
| 2020/0007498 A1 | 1/2020 | Tang | H01L 29/06 |
| 2020/0084235 A1 | 3/2020 | Tang | H04L 29/06 |
| 2020/0218221 A1 | 7/2020 | Gendelman | G05B 19/05 |

OTHER PUBLICATIONS

Search Report for International Application No. PCT/CN2020/093522, 13 pages, dated Feb. 24, 2021.

* cited by examiner

INDUSTRIAL CONTROL SYSTEM SECURITY ANALYSIS METHOD AND APPARATUS

CROSS-REFERENCE TO RELATED APPLICATIONS

This application is a U.S. National Stage Application of International Application No. PCT/CN2020/093522 filed May 29, 2020, which designates the United States of America, the contents of which are hereby incorporated by reference in their entirety.

TECHNICAL FIELD

The present disclosure relates to the technical field of communications. Various embodiments include industrial network behavior analysis methods and/or apparatus.

BACKGROUND

With the continuous development and progress of the Internet of Things (IOT) technology and the Operational Technology (OT), a large production enterprise requires that all industrial control systems should be monitored in a security monitoring system. Therefore, different industrial control systems will be connected to one security monitoring system to constitute an OT network. However, the OT network has a high risk of being maliciously attacked because of a weak security defense capability of the industrial control systems.

Currently, when the security of an industrial control system is analyzed, communication data packets transmitted between control devices in the industrial control system to be analyzed are collected, and then the security of the industrial control system to be analyzed is analyzed according to the collected communication data packets to determine whether the industrial control system to be analyzed has a risk of being maliciously attacked. For the current method of analyzing the security of an industrial control system, the security of the industrial control system to be analyzed is analyzed according to communication data packets collected from the industrial control system to be analyzed, with the influence between different industrial control systems in one OT network not considered. However, an industrial control system may influence the security of another industrial control system in the same OT network when maliciously attacked. Thus, the security of the industrial control system cannot be analyzed accurately.

SUMMARY

In view of this, the teachings of the present disclosure include industrial control system security analysis methods apparatus, and computer-readable medium used to analyze the security of an industrial control system more accurately. For example, some embodiments of the teachings herein include an industrial control system security analysis method, comprising: collecting a communication data packet from a first industrial control system, wherein an OT network comprises the first industrial control system and at least one second industrial control system connected with the first industrial control system and the communication data packet is interactive data transmitted between control devices in the first industrial control system; extracting network identifiable information from the communication data packet, wherein the network identifiable information is configured to identify at least one of a communication object, a communication rule and a communication content; determining whether the network identifiable information is located in a pre-created event database; if the network identifiable information is located in the event database, performing the following: determining that the communication data packet is a malicious data packet; acquiring security policies of the first industrial control system and each of the second industrial control system in the OT network, wherein the security policies are configured to represent the rules for processing a malicious data packet; determining a threat coefficient of the communication data packet for each of the second industrial control system according to the network identifiable information and each of the security policies, wherein the threat coefficient is configured to represent a degree of threat of the communication data packet to the corresponding second industrial control system.

In some embodiments, determining whether the network identifiable information is located in a pre-created event database comprises: acquiring at least one identification parameter contained in the network identifiable information, wherein the identification parameters include at least one of the device asset information of the control device receiving and sending the communication data packet, the Internet protocol (IP) address of the control device receiving and sending the communication data packet, the port and protocol used for transmitting the communication data packet, the application information of the application for receiving and sending the communication data packet, and the identifier of the protocol used for transmitting the communication data packet; determining whether at least one identification parameter exists in the event database; if the at least one identification parameter exists in the event database, determining that the network identifiable information is located in the event database; if none of the identification parameters exists in the event database, determining that the network identifiable information is not located in the event database.

In some embodiments, acquiring security policies of the first industrial control system and each of the second industrial control systems respectively comprises: for each of the second industrial control systems, acquiring the security policy from the firewall between the second industrial control system and the first industrial control system; for each of the control devices in the first industrial control system, acquiring the security policy from the firewall of the control device; for each of the control devices in the second industrial control system, acquiring the security policy from the firewall of the control device.

In some embodiments, determining a threat coefficient of the communication data packet for each of the second industrial control system according to the network identifiable information and each security policy comprises: for said one control device located in said one second industrial control system, performing the following: determining a first probability of the communication data packet passing the firewall between the second industrial control system where the control device is located and the first industrial control system according to the network identifiable information and a first security policy, wherein the first security policy is a security policy used for the firewall between the second industrial control system where the control device is located and the first industrial control system; determining a second probability of the communication data packet posing a threat to the control device after passing the firewall between the first industrial control system and the second industrial control system where the control device is located according to the network identifiable information and a second security policy, wherein the second security policy is a security policy used for the firewall of the control device; determining a threat coefficient component for the control device according to the first probability, the second probability and an importance weight of the control device, wherein the importance weight is positively correlated with the importance coefficient of the control device in the second industrial control system; for each of the second industrial control system, determining a threat coefficient of the communication data packet for said each of the second industrial control systems according to the threat coefficient component for each control device in the second industrial control system.

In some embodiments, after acquiring security policies of the first industrial control system and each of the second industrial control systems respectively, the method further comprises: determining target control devices having a risk of being attacked by the communication data packet in the OT network according to extracted network identifiable information and the security policies; determining a threat coefficient of the communication data packet for each target control device respectively according to the network identifiable information; sending the threat coefficient for each of the target control devices to a manager; generating optimization suggestions for optimizing at least one of said acquired security policies according to the network identifiable information after receiving a confirmation instruction sent by the manager according to the threat coefficient for each target control device.

As another example, some embodiments include an industrial control system security analysis apparatus comprising: a data acquisition module (41), configured to collect a communication data packet from a first industrial control system, wherein an OT network comprises the first industrial control system and at least one second industrial control system connected with the first industrial control system and the communication data packet is interactive data transmitted between control devices in the first industrial control system; an information extraction module (42), configured to extract network identifiable information from the communication data packet collected by the data acquisition module (41), wherein the network identifiable information is configured to identify at least one of a communication object, a communication rule and a communication content; a determination module (43), configured to determine whether the network identifiable information extracted by the information extraction module (42) is located in a pre-created event database; a first analysis module (44), configured to determine that the communication data packet is a malicious data packet when the determination module (43) determines that the network identifiable information is located in the event database; a policy acquisition module (45), configured to acquire security policies of the first industrial control system and each of the second industrial control systems respectively when the determination module (43) determines that the network identifiable information is located in the event database, wherein the security policies are configured to represent the rules for processing a malicious data packet; a second analysis module (46), configured to determine a threat coefficient of the communication data packet for each of the second industrial control systems according to the network identifiable information extracted by the information extraction module (42) and each of the security policies acquired by the policy acquisition module (45), wherein the threat coefficient is configured to represent a degree of threat of the communication data packet to the corresponding second industrial control system.

In some embodiments, the determination module (43) comprises: a parameter identification unit (431), configured to acquire at least one identification parameter contained in the network identifiable information, wherein the identification parameters include at least one of the device asset information of the control device receiving and sending the communication data packet, the Internet protocol (IP) address of the control device receiving and sending the communication data packet, the port and protocol used for transmitting the communication data packet, the application information of the application for receiving and sending the communication data packet, and the identifier of the protocol used for transmitting the communication data packet; a parameter finding unit (432), configured to determine whether at least one of the identification parameters acquired by the parameter identification unit (431) exists in the event database; a first determination unit (433), configured to determine that the network identifiable information is located in the event database when the parameter finding unit (432) determines that at least one of the identification parameters exists in the event database; a second determination unit (434), configured to determine that the network identifiable information is not located in the event database when the parameter finding unit (432) determines that none of the identification parameters exists in the event database.

In some embodiments, the policy acquisition module (45) comprises: a first policy acquisition unit (451), configured to acquire the security policy for each of the second industrial control systems from the firewall between the second industrial control system and the first industrial control system; a second policy acquisition unit (452), configured to acquire the security policy for each of the control devices in the first industrial control system from the firewall of the control device; a third policy acquisition unit (453), configured to acquire the security policy for each of the control devices in the second industrial control system from the firewall of the control device.

In some embodiments, the second analysis module (46) comprises: a first calculation unit (461), configured for a control device located in a second industrial control system to determine a first probability of the communication data packet passing the firewall between the second industrial control system where the control device is located and the first industrial control system according to the network identifiable information and a first security policy, wherein the first security policy is a security policy used for the firewall between the second industrial control system where the control device is located and the first industrial control system; a second calculation unit (462), configured for one of the control devices located in one of the second industrial control systems to determine a second probability of the communication data packet posing a threat to the control device after passing the firewall between the first industrial control system and the second industrial control system where the control device is located according to the network identifiable information and a second security policy, wherein the second security policy is a security policy used for the firewall of the control device; a third calculation unit (463), configured for a control device located in a second industrial control system to determine a threat coefficient component for the control device according to an importance weight of the control device, the first probability determined by the first calculation unit (461) and the second probability determined by the second calculation unit (462), wherein the importance weight is positively correlated with the importance coefficient of the control device in the second industrial control system; a fourth calculation unit (464), configured to determine for each of the second industrial control systems a threat coefficient of the communication data packet for the second industrial control system according to the threat coefficient component determined by the third calculation unit (463) for each control device in the second industrial control system.

In some embodiments, the apparatus further comprises: a device screening module (47), configured to determine target control devices having a risk of being attacked by the communication data packet in the OT network according to the network identifiable information extracted by the information extraction module (42) and the security policies acquired by the policy acquisition module (45); a coefficient calculation module (48), configured to determine a threat coefficient of the communication data packet for each of the target control devices determined by the device screening module (47) respectively according to the network identifiable information acquired by the information extraction module (42); an information sending module (49), configured to send the threat coefficient determined by the coefficient calculation module (48) for each of the target control devices to a manager; a policy optimization module (410), configured to generate optimization suggestions for optimizing at least one of the security policies acquired by the policy acquisition module (45) according to the network identifiable information after receiving a confirmation instruction sent by the manager according to the threat coefficient sent by the information sending module (49) for each of the target control devices.

As another example, some embodiments include an industrial control system security analysis apparatus, comprising at least one memory (411) and at least one processor (412); the at least one memory (411) being configured to store a machine-readable program; the at least one processor (412) being configured to invoke the machine-readable program to execute one or more of the methods described herein.

As another example, some embodiments include a computer-readable medium, computer instructions being stored in the computer-readable medium and a processor executing one or more of the methods described herein when the computer instructions are executed by the processor.

DESCRIPTION OF REFERENCE NUMERALS IN THE DRAWINGS

Figure 1:
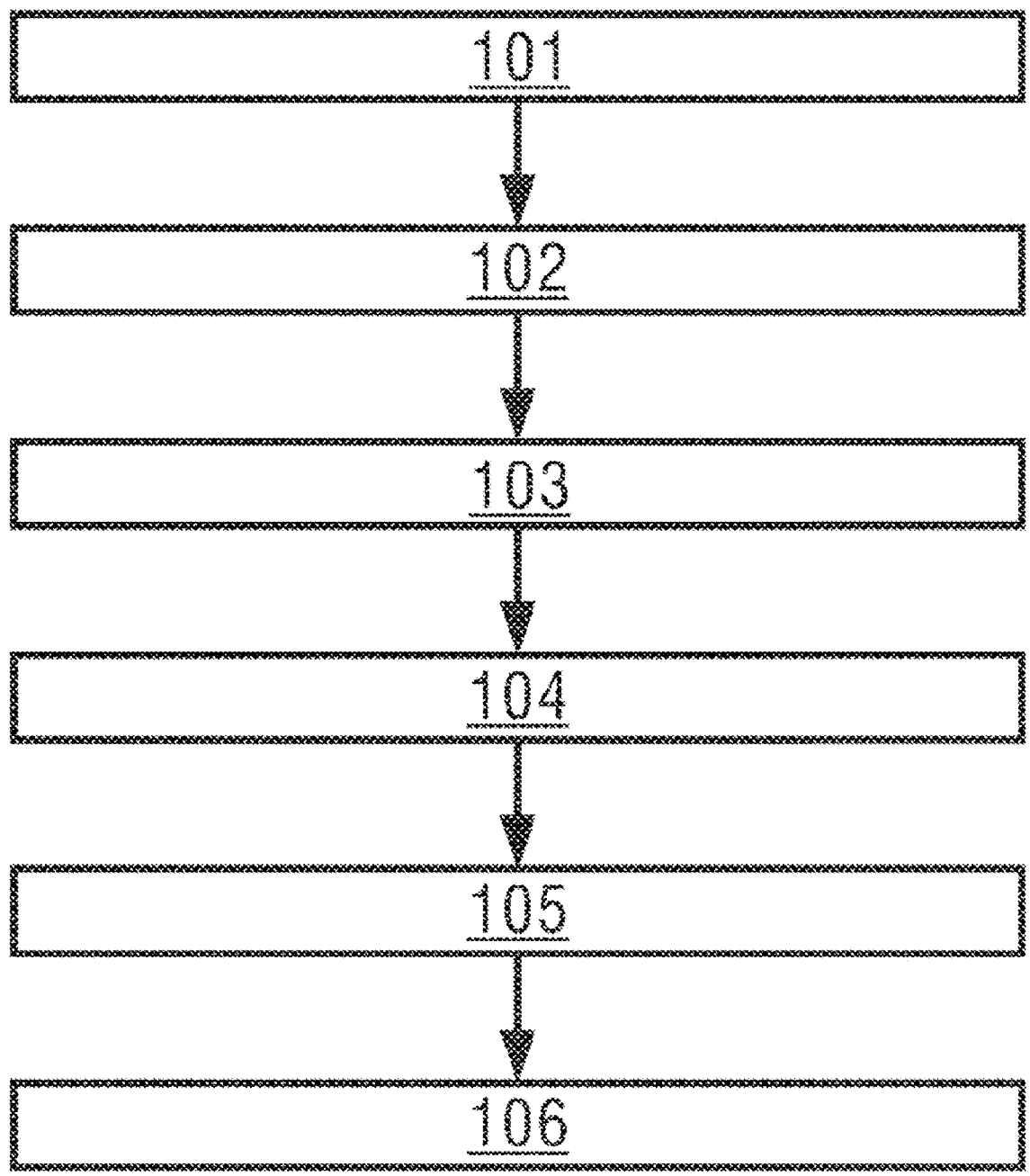
FIG. 1 is a flowchart of an industrial control system security analysis method incorporating teachings of the present disclosure.

101: Collect a communication data packet from a first industrial control system
102: Extract network identifiable information from the communication data packet
103: Determine whether the network identifiable information is located in a pre-created event database
104: Determine that the communication data packet is a malicious data packet if the network identifiable information is located in the event database
105: Acquire security policies of the first industrial control system and each of the second industrial control systems in the OT network
106: Determine a threat coefficient of a communication data packet for the second industrial control system according to the network identifiable information and the security policy
201: Determine a first probability according to the network identifiable information and a first security policy
202: Determine a second probability according to the network identifiable information and a second security policy
203: Determine a threat coefficient component for the control device according to the first probability, the second probability and an importance weight of the control device
204: Determine a threat coefficient according to the threat coefficient component for each of the control devices in the second industrial control system
301: Determine target control devices having a risk of being attacked by the communication data packet according to the network identifiable information and security policies
302: Determine a threat coefficient of the communication data packet for each target control device respectively according to the network identifiable information
303: Send the threat coefficient for each target control device to a manager
304: Generate optimization suggestions according to the network identifiable information after receiving a confirmation instruction
41: Data acquisition module
42: Information extraction module
43: Determination module
44: First analysis module
45: Policy acquisition module
46: Second analysis module
47: Device screening module
48: Coefficient calculation module
49: Information sending module
410: Policy optimization module
411: Memory
412: Processor 431: Parameter identification unit
432: Parameter finding unit
433: First determination unit
434: Second determination unit
451: First policy acquisition unit
452: Second policy acquisition unit
453: Third policy acquisition unit
461: First calculation unit
462: Second calculation unit
463: Third calculation unit
464: Fourth calculation unit

DETAILED DESCRIPTION

In some embodiments, an industrial control system security analysis method comprises: collecting a communication data packet from a first industrial control system, wherein an OT network comprises the first industrial control system and at least a second industrial control system connected with the first industrial control system and the communication data packet is interactive data transmitted between control devices in the first industrial control system; extracting network identifiable information from the communication data packet, wherein the network identifiable information is configured to identify at least one of a communication object, a communication rule and a communication content; determining whether the network identifiable information is located in a pre-created event database; if the network identifiable information is located in the event database, performing the following operation: determining that the communication data packet is a malicious data packet; acquiring security policies of the first industrial control system and each of the second industrial control systems in the OT network, wherein the security policies are configured to represent the rules for processing a malicious data packet; determining a threat coefficient of the communication data packet for each second industrial control system according to the network identifiable information and each security policy, wherein the threat coefficient is configured to represent a degree of threat of the communication data packet to the corresponding second industrial control system.

In some embodiments, determining whether the network identifiable information is located in a pre-created event database comprises: acquiring at least an identification parameter contained in the network identifiable information, wherein the identification parameters include at least one of the device asset information of the control device receiving and sending the communication data packet, the Internet protocol or IP address of the control device receiving and sending the communication data packet, the port and protocol used for transmitting the communication data packet, the application information of the application for receiving and sending the communication data packet, and the identifier of the protocol used for transmitting the communication data packet; determining whether at least one of the identification parameters exists in the event database; if at least one of the identification parameters exists in the event database, determining that the network identifiable information is located in the event database; if none of the identification parameters exists in the event database, determining that the network identifiable information is not located in the event database.

In some embodiments, acquiring security policies of the first industrial control system and each second industrial control system respectively comprises: for each of the second industrial control systems, acquiring the security policy from the firewall between the second industrial control system and the first industrial control system; for each of the control devices in the first industrial control system, acquiring the security policy from the firewall of the control device; for each of the control devices in the second industrial control system, acquiring the security policy from the firewall of the control device.

In some embodiments, determining a threat coefficient of the communication data packet for each of the second industrial control systems according to the network identifiable information and each of the security policies comprises: for one of the control devices located in one of the second industrial control systems, performing the following operations: determining a first probability of the communication data packet passing the firewall between the second industrial control system where the control device is located and the first industrial control system according to the network identifiable information and a first security policy, wherein the first security policy is a security policy used for the firewall between the second industrial control system where the control device is located and the first industrial control system; determining a second probability of the communication data packet posing a threat to the control device after passing the firewall between the first industrial control system and the second industrial control system where the control device is located according to the network identifiable information and a second security policy, wherein the second security policy is a security policy used for the firewall of the control device; determining a threat coefficient component for the control device according to the first probability, the second probability and an importance weight of the control device, wherein the importance weight is positively correlated with the importance coefficient of the control device in the second industrial control system; for each of the second industrial control systems, determining a threat coefficient of the communication data packet for each of the second industrial control system according to the threat coefficient component for each of the control devices in the second industrial control system.

In some embodiments, after acquiring security policies of the first industrial control system and each of the second industrial control systems respectively, the method further comprises: determining target control devices having a risk of being attacked by the communication data packet in the OT network according to extracted network identifiable information and the security policies; determining a threat coefficient of the communication data packet for each of the target control device respectively according to the network identifiable information; sending the threat coefficient for each of the target control devices to a manager; generating optimization suggestions for optimizing at least an acquired security policy according to the network identifiable information after receiving a confirmation instruction sent by the manager according to the threat coefficient for each of the target control devices.

In some embodiments, an industrial control system security analysis apparatus comprises: a data acquisition module, configured to collect a communication data packet from a first industrial control system, wherein an OT network comprises the first industrial control system and at least one second industrial control system connected with the first industrial control system and the communication data packet is interactive data transmitted between control devices in the first industrial control system; an information extraction module, configured to extract network identifiable information from the communication data packet collected by the data acquisition module, wherein the network identifiable information is configured to identify at least one of a communication object, a communication rule and a communication content; a determination module, configured to determine whether the network identifiable information extracted by the information extraction module is located in a pre-created event database; a first analysis module, configured to determine that the communication data packet is a malicious data packet when the determination module determines that the network identifiable information is located in the event database; a policy acquisition module, configured to acquire security policies of the first industrial control system and each of the second industrial control system respectively when the determination module determines that the network identifiable information is located in the event database, wherein the security policies are configured to represent the rules for processing a malicious data packet; a second analysis module, configured to determine a threat coefficient of the communication data packet for each of the second industrial control systems according to the network identifiable information extracted by the information extraction module and each of the security policies acquired by the policy acquisition module, wherein the threat coefficient is configured to represent a degree of threat of the communication data packet to the corresponding second industrial control system.

In some embodiments, the determination module comprises: a parameter identification unit, configured to acquire at least an identification parameter contained in the network identifiable information, wherein the identification parameters include at least one of the device asset information of the control device receiving and sending the communication data packet, the Internet protocol or IP address of the control device receiving and sending the communication data packet, the port and protocol used for transmitting the communication data packet, the application information of the application for receiving and sending the communication data packet, and the identifier of the protocol used for transmitting the communication data packet; a parameter finding unit, configured to determine whether at least one of the identification parameters acquired by the parameter identification unit exists in the event database; a first determination unit, configured to determine that the network identifiable information is located in the event database when the parameter finding unit determines that at least one of the identification parameters exists in the event database; a second determination unit, configured to determine that the network identifiable information is not located in the event database when the parameter finding unit determines that one of the identification parameter exists in the event database.

In some embodiments, the policy acquisition module comprises: a first policy acquisition unit, configured to acquire the security policy for each of the second industrial control systems from the firewall between the second industrial control system and the first industrial control system; a second policy acquisition unit, configured to acquire the security policy for each of the control devices in the first industrial control system from the firewall of the control device; a third policy acquisition unit, configured to acquire the security policy for each of the control devices in the second industrial control system from the firewall of the control device.

In some embodiments, the second analysis module comprises: a first calculation unit, configured for a control device located in a second industrial control system to determine a first probability of the communication data packet passing the firewall between the second industrial control system where the control device is located and the first industrial control system according to the network identifiable information and a first security policy, wherein the first security policy is a security policy used for the firewall between the second industrial control system where the control device is located and the first industrial control system; a second calculation unit, configured for a control device located in a second industrial control system to determine a second probability of the communication data packet posing a threat to the control device after passing the firewall between the first industrial control system and the second industrial control system where the control device is located according to the network identifiable information and a second security policy, wherein the second security policy is a security policy used for the firewall of the control device; a third calculation unit, configured for a control device located in a second industrial control system to determine a threat coefficient component for the control device according to an importance weight of the control device, the first probability determined by the first calculation unit and the second probability determined by the second calculation unit, wherein the importance weight is positively correlated with the importance coefficient of the control device in the second industrial control system; a fourth calculation unit, configured for each of the second industrial control systems to determine a threat coefficient of the communication data packet for each of the second industrial control systems according to the threat coefficient component determined by the third calculation unit for each of the control devices in the second industrial control system.

In some embodiments, the industrial control system security apparatus further comprises: a device screening module, configured to determine target control devices having a risk of being attacked by the communication data packet in the OT network according to the network identifiable information extracted by the information extraction module and the security policies acquired by the policy acquisition module; a coefficient calculation module, configured to determine a threat coefficient of the communication data packet for each of the target control devices determined by the device screening module respectively according to the network identifiable information acquired by the information extraction module; an information sending module, configured to send the threat coefficient determined by the coefficient calculation module for each of the target control devices to a manager; a policy optimization module, configured to generate optimization suggestions for optimizing at least a security policy acquired by the policy acquisition module according to the network identifiable information after receiving a confirmation instruction sent by the manager according to the threat coefficient sent by the information sending module for each target control device.

In some embodiments, an industrial control system security analysis apparatus comprises at least one memory and at least one processor, wherein the at least one memory is configured to store a machine-readable program, and the at least one processor is configured to invoke the machine-readable program to execute one or more of the methods described herein.

In some embodiments, a computer-readable medium stores computer instructions. When the computer instructions are executed by a processor, the processor executes one or more of the methods described herein.

In some embodiments, an OT network comprises at least two industrial control systems, a communication data packet is collected from a first industrial control system in the OT network, network identifiable information is extracted from the collected communication data packet, then it is determined whether the collected communication data packet is a malicious data packet or not according to the extracted network identifiable information and a pre-created event database, security policies of industrial control systems in the OT network are further acquired if the collected communication data packet is a malicious data packet possibly attacking the first industrial control system, and the threat coefficient of the malicious data packet for each of the second industrial control system other than the first industrial control system in the OT network is determined according to the acquired security policies and the extracted network identifiable information. It can be seen that, for any industrial control system in the OT network, not only whether a communication data packet transmitted between control devices in the industrial control system is a malicious data packet will be analyzed, but also the threat of malicious data packets transmitted in other industrial control systems to the industrial control system will be analyzed according to the security policies of industrial control systems in the OT network. Thus, the security problem existing in industrial control systems can be analyzed more comprehensively, and the security of the industrial control systems can be analyzed more accurately.

As described above, communication data packets transmitted between control devices in an industrial control system in an OT network consisting of a plurality of industrial control systems may be collected, and then the security of industrial control systems may be analyzed according to the collected communication data packets, wherein communication data packets may be control instructions or device state information. Currently, when the security of industrial control systems is analyzed, communication data packets transmitted between control devices in each industrial control system are collected respectively, and then the security of the corresponding industrial control system is analyzed according to the collected communication data packets. However, industrial control systems in an OT network will influence each other. An industrial control system may influence the security of another industrial control system in the OT network when attacked maliciously. Therefore, the security of each industrial control system is independently analyzed according to the communication data packets transmitted between control devices, a malicious attack on an industrial control system cannot be reflected comprehensively. As a result, the security of an industrial control system cannot be analyzed accurately.

In some embodiments, a communication data packet is collected from an industrial control system, the security policies of industrial control systems in an OT network where the industrial control system is located are acquired when the collected communication data packet is determined to be a malicious data packet, and then the threat coefficients of the malicious data packet for other industrial control systems in the OT network are analyzed according to the acquired security policies. Thus, it can be seen that when the security of an industrial control system is analyzed, not only whether a communication data packet between control devices in the current industrial control system is a malicious data packet is checked, but also the threat of malicious data collected in other industrial control systems to the current industrial control system is determined according to security policies of industrial control systems in one OT network, and then the security of the industrial control system can be analyzed more comprehensively to guarantee the accuracy of the analysis of the security of the industrial control system.

As shown in FIG. 1, various embodiments of the teachings of the present disclosure include an industrial control system security analysis method comprising:

Step 101: collect a communication data packet from a first industrial control system, wherein an OT network comprises the first industrial control system and at least one second industrial control system connected with the first industrial control system and the communication data packet is interactive data transmitted between control devices in the first industrial control system;

Step 102: extract network identifiable information from the communication data packet, wherein the network identifiable information is configured to identify at least one of a communication object, a communication rule and a communication content;

Step 103: determine whether the network identifiable information is located in a pre-created event database;

Step 104: determine that the communication data packet is a malicious data packet if the network identifiable information is located in the event database;

Step 105: acquire security policies of the first industrial control system and each of the second industrial control system in the OT network, wherein the security policies are configured to represent the rules for processing a malicious data packet;

Step 106: determine a threat coefficient of the communication data packet for each of the second industrial control systems according to the network identifiable information and each security policy, wherein the threat coefficient is configured to represent a threat degree of the communication data packet for the corresponding second industrial control system.

In some embodiments, an OT network comprises at least two industrial control systems, a communication data packet is collected from a first industrial control system in the OT network, network identifiable information is extracted from the collected communication data packet, then it is determined whether the collected communication data packet is a malicious data packet or not according to the extracted network identifiable information and a pre-created event database, security policies of industrial control systems in the OT network are further acquired if the collected communication data packet is a malicious data packet possibly attacking the first industrial control system, and the threat coefficient of the malicious data packet for each of the second industrial control system other than the first industrial control system in the OT network is determined according to the acquired security policies and the extracted network identifiable information. It can be seen that, for any industrial control system in the OT network, not only whether a communication data packet transmitted between control devices in the industrial control system is a malicious data packet will be analyzed, but also the threat of malicious data packets transmitted in other industrial control systems to the industrial control system will be analyzed according to the security policies of industrial control systems in the OT network. Thus, the security problem existing in industrial control systems can be analyzed more comprehensively, and the security of the industrial control systems can be analyzed more accurately.

In some embodiments, when a communication data packet is collected from the first industrial control system, the traffic of the first industrial control system can be intercepted to obtain communication data packets transmitted between control devices in the first industrial control systems. Specifically, a probe (data acquisition sensor) is set in the first industrial control system, and the probe is used to intercept traffic from the access switch and the system bus in the first industrial control system, wherein the system bus is used to connect a programmable logic controller (PLC) with engineer stations and operator stations, and the access switch is used to connect an operation center with engineer stations and operator stations.

In some embodiments, on the basis of the industrial control system security analysis method shown in FIG. 1, the collected communication data packet is interactive data, for example, control instructions or state feedback information, transmitted between control devices in the industrial control system. To help to analyze the security of the industrial control system according to the communication data packet, it is necessary to extract network identifiable information from the communication data packet. Network identifiable information is configured to identify the communication object, communication rule and communication content of the corresponding communication data packet. Then, whether the communication data packet is a malicious data packet or not is determined according to the communication object, communication rule and the communication content. On the basis that the communication data packet is determined to be a malicious data packet, the threat of the communication data packet to other industrial control systems is determined.

Network identifiable parameters may include any one or more of the following identification parameters: asset information, IP address, communication port, communication protocol, application information and special identifications in a protocol. Among them, the asset information is the device asset information of the control device receiving and sending the corresponding communication data packet, for example, device name, device type, device supplier, and version number of operating system/firmware of the device, the IP address is the IP address of the control device receiving the corresponding communication data packet, the communication port is the port used for receiving and sending the corresponding communication data packet, the communication protocol is the protocol used for receiving and sending the corresponding communication data packet, and the application information is the application information of the application for receiving and sending the corresponding communication data packet, for example, application name and version.

In some embodiments, after network identifiable information is extracted from a communication data packet, whether at least one of identification parameters contained in the network identifiable information exists in a pre-created event database can be detected. If at least one identification parameter contained in the network identifiable information exists in the event database, the collected communication data packet is determined to be a malicious data packet. If none of the identification parameters contained in the network identifiable information exists in the event database, the collected data packet is determined to be a legal data packet. Identification parameters which malicious data packets have are stored in the event database, and then the identification parameters contained in network identifiable information are matched against the identification parameters in the event database. Thus, it is possible to accurately determine whether a communication data packet which the network identifiable information corresponds to is a malicious data packet or not, and then the accuracy of the analysis of the security of an industrial control system can be further guaranteed.

In some embodiments, on the basis of the industrial control system security analysis method shown in FIG. 1, after a communication data packet is determined to be a malicious data packet, security policies of industrial control systems in the OT network are be acquired, and then the threat of the communication data packet to the industrial control systems are analyzed according to the acquired security policies. Security policies of industrial control systems in the OT network can be acquired in the following ways:

for each second industrial control systems in the OT network, the security policy is acquired from the firewall between the second industrial control system and the first industrial control system;

for each control device in the first industrial control system in the OT network, the security policy is acquired from the firewall of the control device;

for each control device in the second industrial control system in the OT network, the security policy is acquired from the firewall of the control device.

In some embodiments, after a communication data packet collected from the first industrial control system is determined to be a malicious data packet, the communication data packet will possibly be transmitted from one control device to another control device in the first industrial control system, or transmitted from the first industrial control system to the second industrial control system, or transmitted from one control device to another control device in the second industrial control system, the firewall of a control device is used to filter a malicious data packet received by the control device, the firewall between industrial control systems is used to filter a malicious data packet transmitted between industrial control systems, and the firewalls filter malicious data packets according to the corresponding security policies. Therefore, by acquiring security policies from the firewalls of control devices and the firewalls between industrial control systems, the threat coefficients of the threats posed by malicious data packets transmitted to corresponding industrial control systems via different paths can be analyzed, and in addition, the control devices which will possibly be attacked by malicious data packets and the specific degree at which the control devices will be influenced can be analyzed. Thus, the security of industrial control systems can be analyzed more comprehensively.

In some embodiments, security policies are the bases for filtering and processing malicious data packets, and to be specific, security policies may be permitted/denied source addresses, permitted/denied destination addresses, permitted/denied services/protocols and permitted/denied secure areas.

Figure 2:
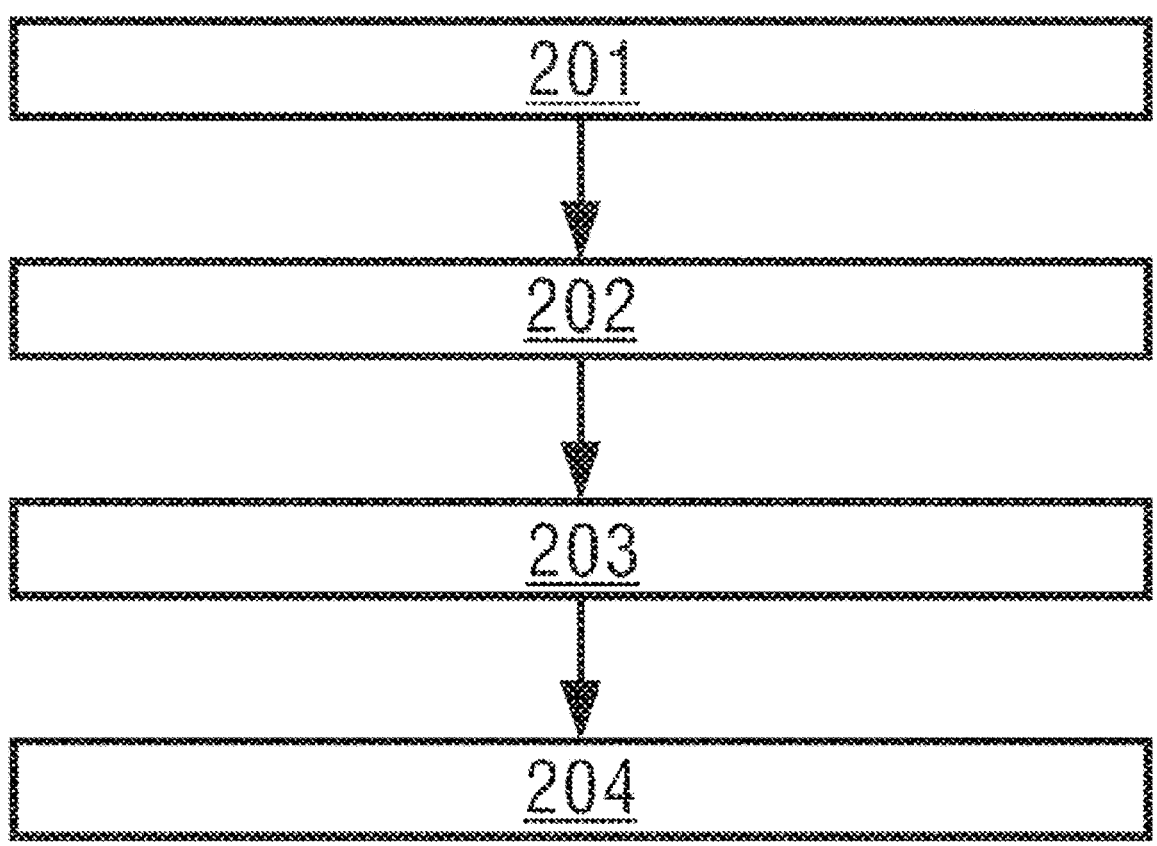
FIG. 2 is a flowchart of an industrial control system threat coefficient determination method incorporating teachings of the present disclosure.

In some embodiments, after security policies are acquired from the firewalls of the control devices and the firewalls between industrial control systems in the OT network, the threat coefficient of a communication data packet for each of the second industrial control systems can be determined according to the network identifiable information extracted from the communication data packet and the acquired security policies. As shown in FIG. 2, the threat coefficient of the communication data packet for a second industrial control system can be determined in the following way:

Step 201: determine a first probability of the communication data packet passing the firewall between the second industrial control system where the control device is located and the first industrial control system for each control device in the second industrial control system according to the network identifiable information and a first security policy, wherein the first security policy is a security policy used for the firewall between the second industrial control system where the control device is located and the first industrial control system;

Step 202: for each control device in the second industrial control system, determine a second probability of the communication data packet posing a threat to the control device after passing the firewall between the first industrial control system and the second industrial control system where the control device is located according to the network identifiable information and a second security policy, wherein the second security policy is a security policy used for the firewall of the control device;

Step 203: for each control device in the second industrial control system, determine a threat coefficient component for the control device according to the first probability, the second probability and an importance weight of the control device, wherein the importance weight is positively correlated with the importance coefficient of the control device in the second industrial control system;

Step 204: determine a threat coefficient of the communication data packet for each of the second industrial control systems according to the threat coefficient component for the control devices in the second industrial control system.

In some embodiments, the first probability is configured to represent the probability of the communication data packet passing the firewall between the first industrial control system and the second industrial control system, the second probability is configured to represent the probability of the communication data packet posing a threat to a corresponding control device in the second industrial control system after passing the first industrial control system and the second industrial control system, the first security policy is a security policy acquired from the firewall between the first industrial control system and the second industrial control system, and the second security policy is a security policy of a corresponding control device in the second industrial control system. The first probability can be determined according to the matching relationship between the network identifiable information and the first security policy, and the second probability can be determined according to the matching relationship between the network identifiable information and the second security policy.

In some embodiments, since one industrial control system usually comprises a plurality of control devices and different control devices are responsible for performing different tasks in the industrial control system, different control devices have different importance to the industrial control system. Corresponding importance weights can be preset for different control devices according to their importance to the industrial control system so that the importance weight of a control device corresponds to the importance of the control device to the industrial control system. For a control device in a second industrial control system, the threat coefficient component for the control device can be determined according to the first probability, the second probability and the importance weight corresponding to the control device. Then the threat coefficient components of control devices in the second industrial control system can be summed up to obtain the threat coefficient of the communication data packet for the second industrial control system.

In some embodiments, the probability of a malicious data packet passing firewalls to reach control devices can be determined according to the security policy acquired from the firewall between industrial control systems and the security policies acquired from the firewalls of control devices, the threat coefficient component for a control device can be determined according to the probability of the malicious data packet reaching the control device and the importance of the control device to the industrial control system, and the threat coefficient of a communication data packet for an industrial control system can be determined according to the threat coefficient components of control devices in the industrial control system. When the threat coefficient of a communication data packet for an industrial control system is determined, the probability of control devices in an industrial control system being influenced by a communication data packet and the importance of control devices to the industrial control system are considered together so that the determined threat coefficient is more accurate. Thus, the accuracy of the analysis of the security of an industrial control system is further improved.

Figure 3:
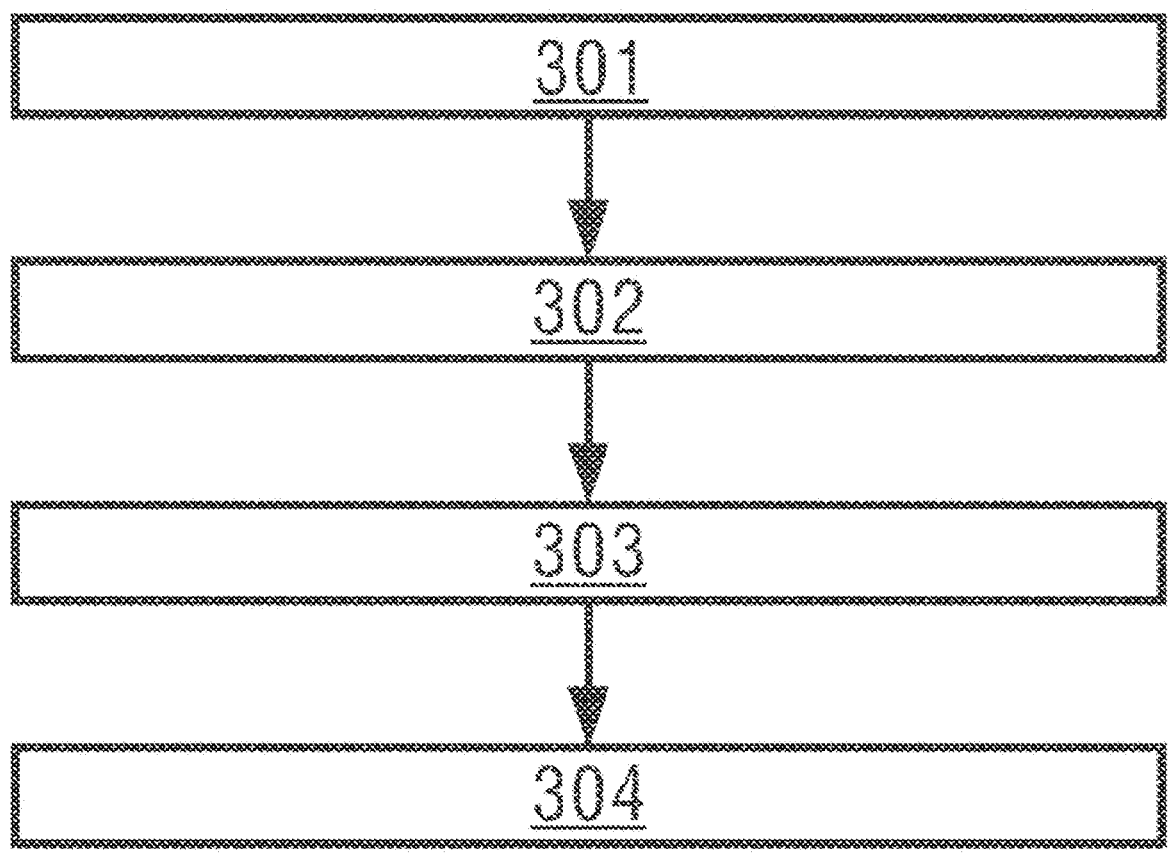
FIG. 3 is a flowchart of a security policy optimization suggestion generation method incorporating teachings of the present disclosure.

In some embodiments, on the basis of the industrial control system security analysis method provided by the above-mentioned embodiments, after the security policies of the first industrial control system and each second industrial control system are acquired, all the control devices that are possibly attacked by a communication data packet can be determined according to the acquired security policies, and optimization suggestions for optimizing security policies can be generated according to all the control devices that are possibly attacked by the communication data packet. As shown in FIG. 3, the method for optimizing security policies may comprise the following steps:

Step 301: determine target control devices having a risk of being attacked by the communication data packet in the OT network according to extracted network identifiable information and the security policies;

Step 302: determine a threat coefficient of the communication data packet for each target control device respectively according to the network identifiable information;

Step 303: send the threat coefficient for each target control device to a manager;

Step 304: generate optimization suggestions for optimizing at least an acquired security policy according to the network identifiable information after receiving a confirmation instruction sent by the manager according to the threat coefficient for each target control device.

In some embodiments, for a control device in the first industrial control system, the probability of the control device being attacked by a communication data packet is determined according to the degree of matching between the security policy acquired from the firewall of the control device and the network identifiable information, and for a control device in a second industrial control system, the probability of the control device being attacked by a communication data packet is determined according to the degree of matching between the corresponding first security policy and second security policy of the control device and the network identifiable information. An attack probability threshold is preset. When the probability of a control device being attacked by a communication data packet is greater than the attack probability threshold, the control device is determined to be a target control device.

In some embodiments, for each target control device, if the target control device is located in the first industrial control system, the threat coefficient of a communication data packet for the target control device is equal to the probability of the target control device being attacked by the communication data packet, and if the target control device is located in a second industrial control system, the threat coefficient of the communication data packet for the target control device is equal to the product of the first probability and second probability corresponding to the target control device.

In some embodiments, after the threat coefficient for each target control device is determined, each target control device and the threat coefficient for each target control device are sent to a manager, and the manager confirms whether a communication data packet is illegal data packet according to the threat coefficient of each target control device. After a user sends a confirmation instruction indicating that the communication data packet is an illegal data packet, optimization suggestions for optimizing at least one acquired security policy are generated according to the network identifiable information.

In some embodiments, after the target control devices which are possibly attacked by a communication data packet are determined, identification information of each target control device and the threat coefficient are sent to the manager, and the manager determines whether the communication data packet is an illegal data packet according to the identification information of each target control device and the threat coefficient. If the manager determines that the communication data packet is really an illegal data packet, optimization suggestions for optimizing security policies are automatically generated according to the network identifiable information and the generated optimization suggestions are sent to policy optimization software or the manager so that the security policies can be optimized and the optimized security policies can effectively process the communication data packet which is determined to be an illegal data packet. Thus, the security of the industrial control systems and the OT network is improved.

In some embodiments, after the manager confirms that the communication data packet is an illegal data packet, related information of the communication data packet and the identification information of each target control device are sent to an alarm module, and the alarm module sends out alarm information so that a network maintainer can process the communication data packet in time to avoid the communication data packet from posing a heavier attack on the OT network.

In some embodiments, after the network identifiable information is extracted from the communication data packet, whether a pre-created distrusted asset database contains the extracted network identifiable information is detected. If the distrusted asset database contains the network identifiable information, the service or application traffic measurement information corresponding to the communication data packet is determined according to the information stored in the distrusted asset database, and the determined service or application traffic measurement information is sent to the manager so that the manager can determine that the communication data packet is an illegal data packet. In addition, if the manager determines the communication data packet is an illegal data packet according to the identification information of each target control device and the threat coefficient for each control device, the network identifiable information extracted from the communication data packet is stored in the distrusted asset database so that the service or application traffic can be measured for malicious data packets detected subsequently.

In some embodiments, after the communication data packet is determined to be a malicious data packet, the severity of the corresponding event of the communication data packet is detected. If the corresponding event of the communication data packet is severe, security policies are examined to determine whether the firewalls permit the communication data packet to pass, avoiding the communication data packet from causing heavy destructions to industrial control systems and the OT network.

Figure 4:
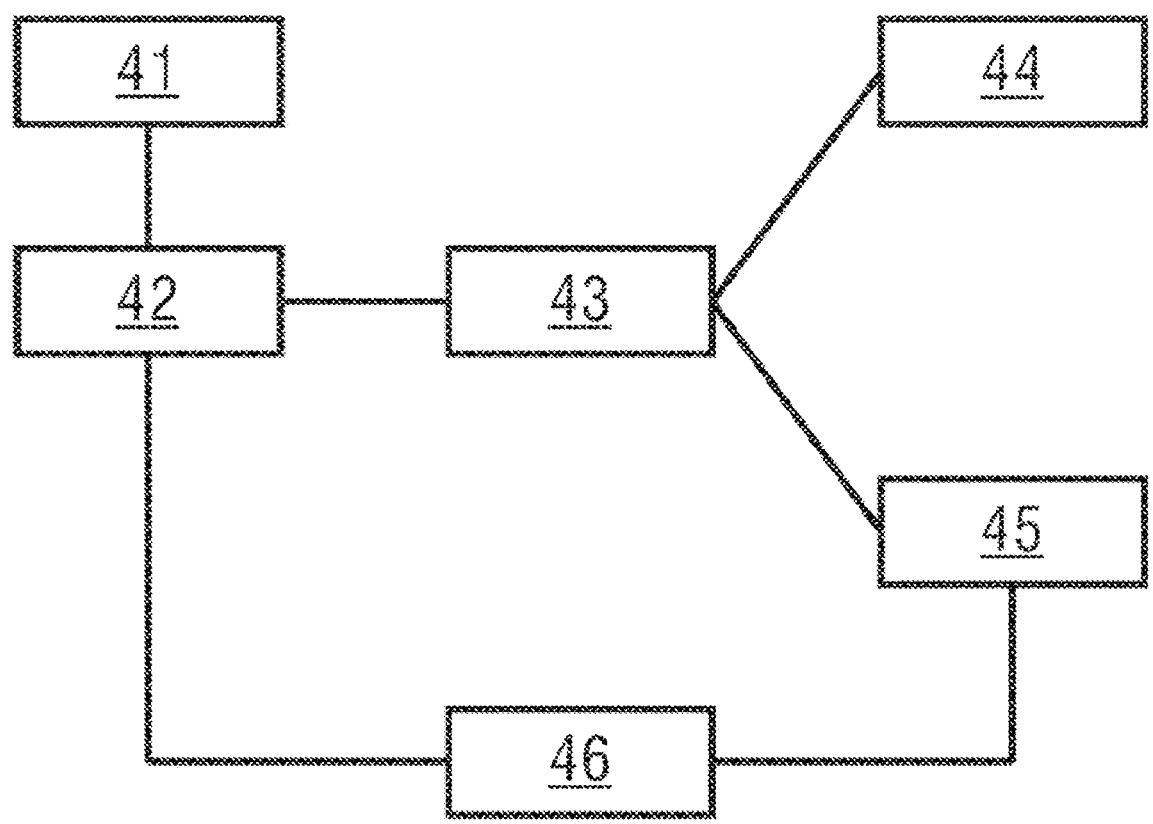
FIG. 4 is a schematic diagram of an industrial control system security analysis apparatus incorporating teachings of the present disclosure.

As shown in FIG. 4, an industrial control system security analysis apparatus may comprise:

a data acquisition module 41, configured to collect a communication data packet from a first industrial control system, wherein an OT network comprises the first industrial control system and at least one second industrial control system connected with the first industrial control system and the communication data packet is interactive data transmitted between control devices in the first industrial control system;

an information extraction module 42, configured to extract network identifiable information from the communication data packet collected by the data acquisition module 41, wherein the network identifiable information is configured to identify at least one of a communication object, a communication rule and a communication content;

a determination module 43, configured to determine whether the network identifiable information extracted by the information extraction module 42 is located in a pre-created event database;

a first analysis module 44, configured to determine that the communication data packet is a malicious data packet when the determination module 43 determines that the network identifiable information is located in the event database;

a policy acquisition module 45, configured to acquire security policies of the first industrial control system and each second industrial control system respectively when the determination module 43 determines that the network identifiable information is located in the event database, wherein the security policies are configured to represent the rules for processing a malicious data packet;

a second analysis module 46, configured to determine a threat coefficient of the communication data packet for each second industrial control system according to the network identifiable information extracted by the information extraction module 42 and each security policy acquired by the policy acquisition module 45, wherein the threat coefficient is configured to represent a threat degree of the communication data packet for the corresponding second industrial control system.

In some embodiments, the data acquisition module 41 can be configured to execute step 101 in the embodiment of the above-mentioned method, the information extraction module 42 can be configured to execute step 102 in the embodiment of the above-mentioned method, the determination module 43 can be configured to execute step 103 in the embodiment of the above-mentioned method, the first analysis module 44 can be configured to execute step 104 in the embodiment of the above-mentioned method, the policy acquisition module 45 can be configured to execute step 105 in the embodiment of the above-mentioned method, and the second analysis module 46 can be used to execute step 106 in the embodiment of the above-mentioned method.

Figure 5:
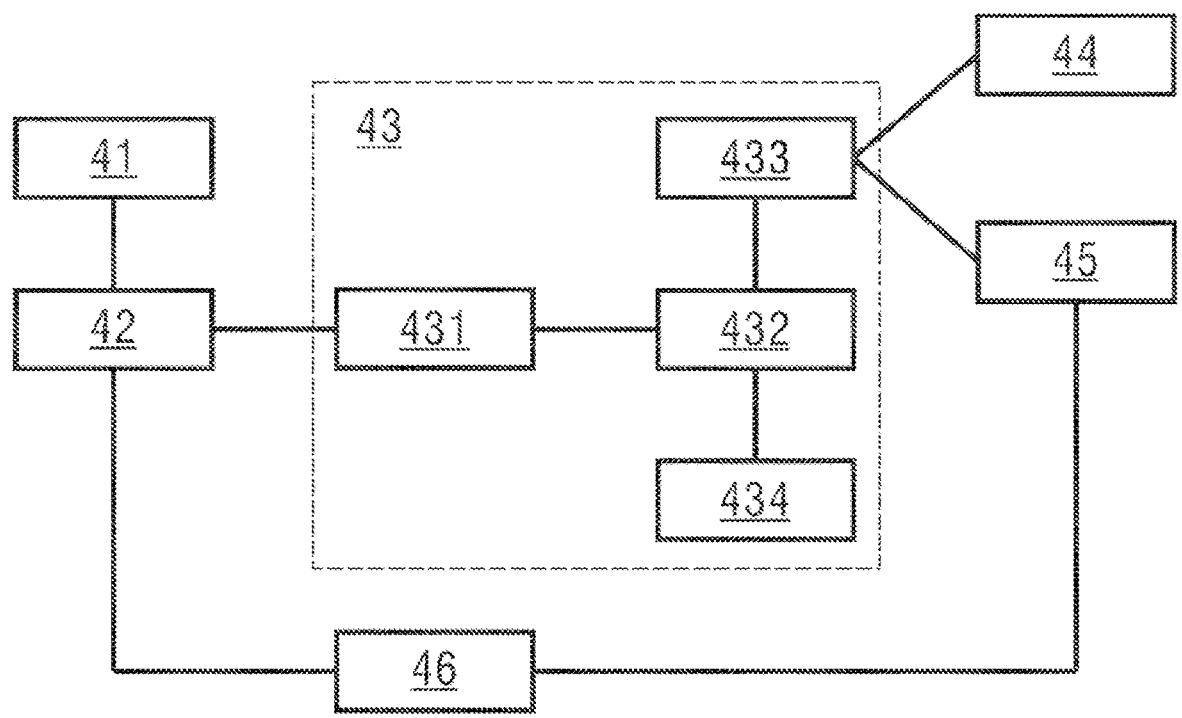
FIG. 5 is a schematic diagram of a further industrial control system security analysis apparatus incorporating teachings of the present disclosure.

In some embodiments, on the basis of the industrial control system security analysis apparatus shown in FIG. 4, as shown in FIG. 5, the determination module 43 comprises:

a parameter identification unit 431, configured to acquire at least an identification parameter contained in the network identifiable information, wherein the identification parameters include at least one of the device asset information of the control device receiving and sending the communication data packet, the Internet protocol (IP) address of the control device receiving and sending the communication data packet, the port and protocol used for transmitting the communication data packet, the application information of the application for receiving and sending the communication data packet, and the identifier of the protocol used for transmitting the communication data packet;

a parameter finding unit 432, configured to determine whether at least an identification parameter acquired by the parameter identification unit 431 exists in the event database;

a first determination unit 433, configured to determine that the network identifiable information is located in the event database when the parameter finding unit 432 determines that at least an identification parameter exists in the event database;

a second determination unit 434, configured to determine that the network identifiable information is not located in the event database when the parameter finding unit 432 determines that no identification parameter exists in the event database.

Figure 6:
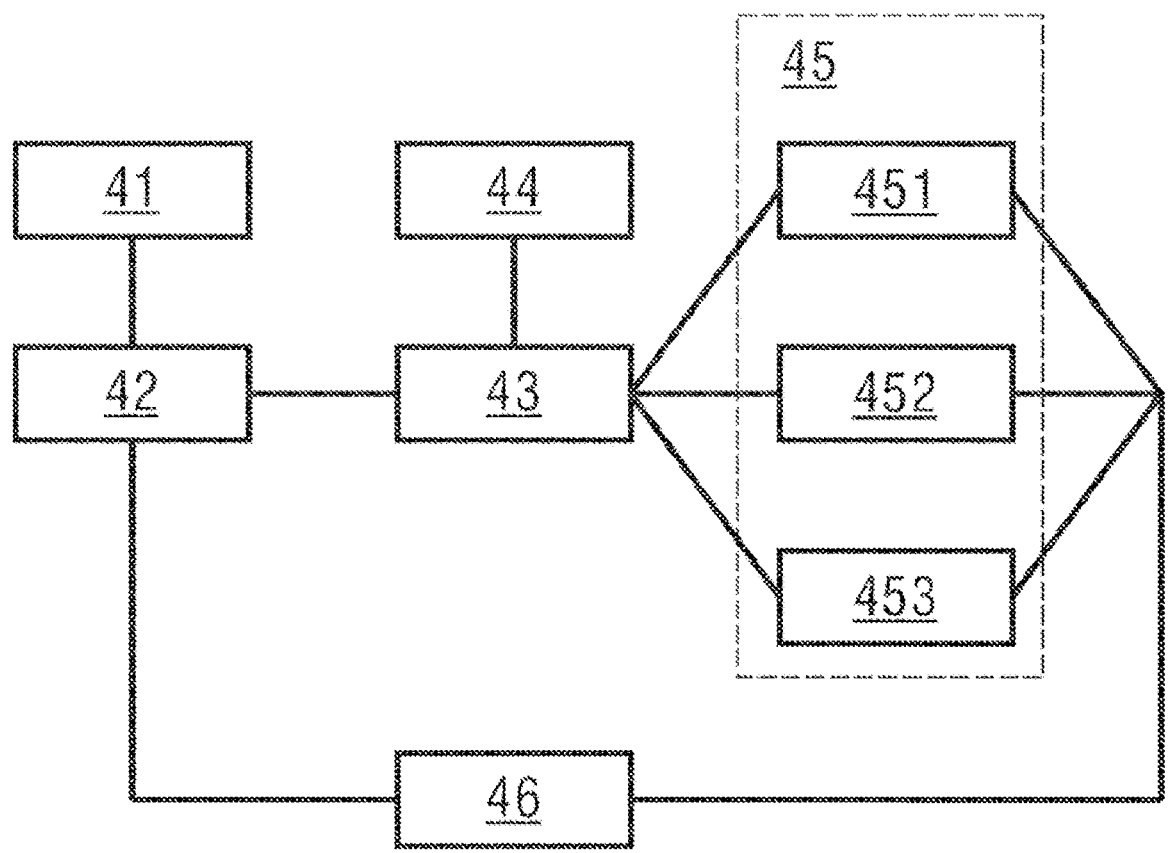
FIG. 6 is a schematic diagram of a still further industrial control system security analysis apparatus incorporating teachings of the present disclosure.

Alternatively, on the basis of the industrial control system security analysis apparatus shown in FIG. 4, as shown in FIG. 6, the policy acquisition module 45 comprises:

a first policy acquisition unit 451, configured to acquire the security policy for each second industrial control system from the firewall between the second industrial control system and the first industrial control system;

a second policy acquisition unit 452, configured to acquire the security policy for each control device in the first industrial control system from the firewall of the control device; and a third policy acquisition unit 453, configured to acquire the security policy for each control device in the second industrial control system from the firewall of the control device.

Figure 7:
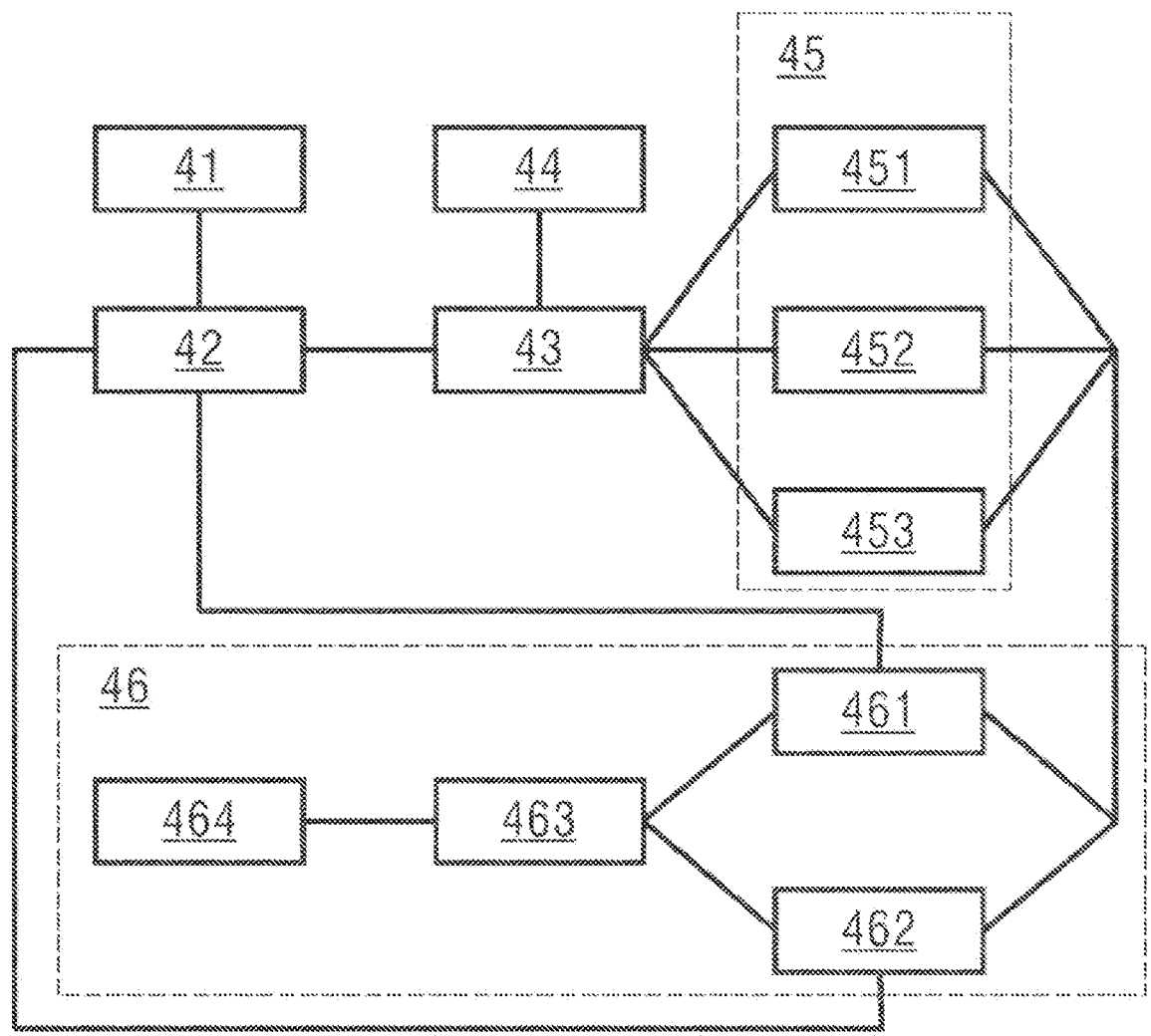
FIG. 7 is a schematic diagram of a yet further industrial control system security analysis apparatus incorporating teachings of the present disclosure.

In some embodiments, on the basis of the industrial control system security analysis apparatus shown in FIG. 6, as shown in FIG. 7, the second analysis module 46 comprises:

a first calculation unit 461, configured for a control device located in a second industrial control system to determine a first probability of the communication data packet passing the firewall between the second industrial control system where the control device is located and the first industrial control system according to the network identifiable information and a first security policy, wherein the first security policy is a security policy used for the firewall between the second industrial control system where the control device is located and the first industrial control system;

a second calculation unit 462, configured for a control device located in a second industrial control system to determine a second probability of the communication data packet posing a threat to the control device after passing the firewall between the first industrial control system and the second industrial control system where the control device is located according to the network identifiable information and a second security policy, wherein the second security policy is a security policy used for the firewall of the control device;

a third calculation unit 463, configured for a control device located in a second industrial control system to determine a threat coefficient component for the control device according to an importance weight of the control device, the first probability determined by the first calculation unit 461 and the second probability determined by the second calculation unit 462, wherein the importance weight is positively correlated with the importance coefficient of the control device in the second industrial control system;

a fourth calculation unit 464, configured for each second industrial control system to determine a threat coefficient of the communication data packet for each second industrial control system according to the threat coefficient component determined by the third calculation unit 463 for each control device in the second industrial control system.

In some embodiments, the first calculation unit 461 can be configured to execute step 201 in the embodiment of the above-mentioned method, the second calculation unit 462 can be configured to execute step 202 in the embodiment of the above-mentioned method, the third calculation unit 463 can be configured to execute step 203 in the embodiment of the above-mentioned method, and the fourth calculation unit 464 can be configured to execute step 204 in the embodiment of the above-mentioned method.

Figure 8:
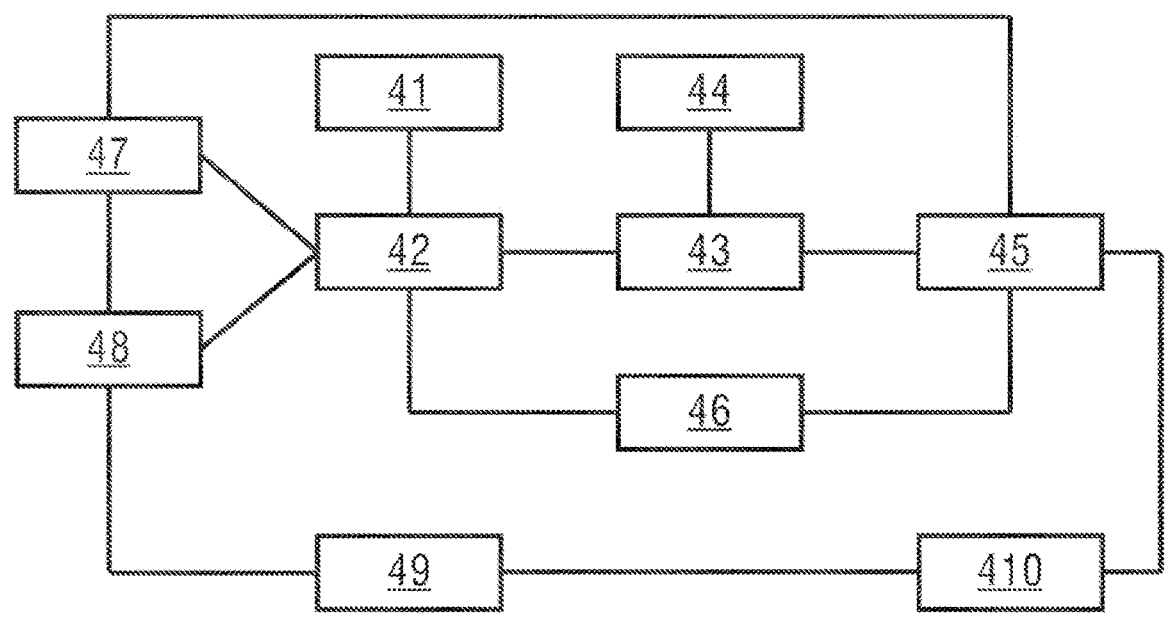
FIG. 8 is a schematic diagram of an industrial control system security analysis apparatus comprising a policy optimization module incorporating teachings of the present disclosure.

In some embodiments, on the basis of the industrial control system security analysis apparatus shown in any of FIGS. 4 to 7, as shown in FIG. 8, the industrial control system security analysis apparatus further comprises:

a device screening module 47, configured to determine target control devices having a risk of being attacked by the communication data packet in the OT network according to the network identifiable information extracted by the information extraction module 42 and the security policies acquired by the policy acquisition module 45;

a coefficient calculation module 48, configured to determine a threat coefficient of the communication data packet for each target control device determined by the device screening module 47 respectively according to the network identifiable information acquired by the information extraction module 42;

an information sending module 49, configured to send the threat coefficient determined by the coefficient calculation module 48 for each target control device to a manager; and a policy optimization module 410, configured to generate optimization suggestions for optimizing at least a security policy acquired by the policy acquisition module 45 according to the network identifiable information after receiving a confirmation instruction sent by the manager according to the threat coefficient sent by the information sending module 49 for each target control device.

In some embodiments, the device screening device 47 can be configured to execute step 301 in the embodiment of the above-mentioned method, the coefficient calculation module 48 can be configured to execute step 302 in the embodiment of the above-mentioned method, the information sending module 49 can be configured to execute step 303 in the embodiment of the above-mentioned method, and the policy optimization module 410 can be configured to execute step 410 in the embodiment of the above-mentioned method.

Figure 9:
FIG. 9 is a schematic diagram of an industrial control system security analysis apparatus comprising a memory and a processor incorporating teachings of the present disclosure.

As shown in FIG. 9, an industrial control system security analysis apparatus may comprise at least one memory 411 and at least one processor 412, wherein the at least one memory 411 is configured to store a machine-readable program, and the at least one processor 412 is configured to invoke the machine-readable program to execute one or more of the industrial control system security analysis methods described herein.

In some embodiments, a computer-readable medium stores instructions allowing a computer to execute one or more of the industrial control system security analysis methods described herein. Specifically, a system or device equipped with a storage medium can be provided. Software program codes which can realize the function in any of above-mentioned embodiments are stored in the storage medium and the computer (or CPU or MPU) of the system or device can read and execute the program codes stored in the storage medium. In this case, program codes read from the storage medium themselves can realize the function in any of the embodiments. Embodiments of the storage medium configured to provide program codes include a floppy disk, hard disk, magneto-optical disk, compact disk (for example, compact disk read-only memory (CD-ROM)), compact disk-recordable (CD-R), compact disk rewritable (CD-RW), digital video disk-read only memory (DVD-ROM), digital versatile disk-random access memory (DVD-RAM), digital versatile disk plus rewritable (DVD+RW), magnetic tape, non-volatile memory card, and read-only memory (ROM). Alternatively, the program codes may be downloaded from a server computer over a communication network.

In some embodiments, the function of any of the above-mentioned embodiments can be realized not only by executing the program codes read out by a computer, but also by allowing the operating system running on the computer to complete a part or all of practical operations through program code based instructions.

In some embodiments, the program codes read out from a storage medium are written into the storage in the expansion board in a computer or are written into a storage in an expansion unit connected to the computer, and then the instructions based on program codes allow the CPU installed on the expansion board or expansion unit to execute a part or all of practical operations to realize the function of any of the above-mentioned embodiments.

It should be noted that not all steps or modules in the above-mentioned flowcharts and system structure diagrams are required, and some steps or modules can be omitted, depending on the actual requirements. The execution sequence of the steps is not fixed and may be adjusted as required. The system structures described in the above-mentioned embodiments can be physical structures or logical structures. That is to say, some modules may be realized by a physical entity, or some modules may be realized by a plurality of physical entities or may jointly be realized by some components in a plurality of self-contained devices.

In some embodiments, hardware units can mechanically or electrically be realized. For example, a hardware unit can comprise a permanent dedicated circuit or logic (for example, special processor, FPGA, or ASIC) to complete the corresponding operations. A hardware unit may further comprise a programmable logic or circuit (for example, a general processor or other programmable processor) and may complete the corresponding operations through temporary software setting. The specific implementation mode (mechanical mode, or dedicated permanent circuit, or circuit which is temporarily set) can be determined on the basis of consideration of cost and time.

The teachings of the present disclosure are described above in detail in combination with the drawings and various example embodiments. However, the scope of the present disclosure is not limited to the disclosed embodiments. On the basis of the plurality of above-mentioned embodiments, those skilled in the art can obtain more embodiments by combining the code review means in the above-mentioned different embodiments, and all these embodiments should also fall within the scope of protection of the present disclosure.

What is claimed is:

1. An industrial control system security analysis method comprising:
    collecting a communication data packet from a first industrial control system, wherein the communication data packet comprises interactive data transmitted between control devices in the first industrial control system;
    extracting network identifiable information from the communication data packet, wherein the network identifiable information identifies at least one of a communication object, a communication rule, and a communication content;
    determining whether the network identifiable information matches a pre-created event database;
    if the network identifiable information matches the event database, performing the following:
    determining that the communication data packet is a malicious data packet;
    acquiring security policies of the first industrial control system and a second industrial control system, wherein the security policies include rules for processing a malicious data packet; and
    determining a threat coefficient of the communication data packet for the second industrial control system based on the network identifiable information and each of the security policies, wherein the threat coefficient represents a degree of threat of the communication data packet to the second industrial control system;
    wherein after acquiring security policies of the first industrial control system and the second industrial control systems respectively, the method further comprises:
    determining target control devices having a risk of being attacked by the communication data packet in the OT network according to extracted network identifiable information and the security policies;
    determining a threat coefficient of the communication data packet for each target control device respectively according to the network identifiable information;
    sending the threat coefficient for each of the target control devices to a manager; and
    generating optimization suggestions for optimizing at least one of said acquired security policies according to the network identifiable information after receiving a confirmation instruction sent by the manager according to the threat coefficient for each target control device.

2. The method as claimed in claim 1, wherein determining whether the network identifiable information matches a pre-created event database comprises:
    acquiring an identification parameter contained in the network identifiable information, wherein the identification parameters include at least one of the device asset information of the control device receiving and sending the communication data packet, the Internet protocol address of the control device receiving and sending the communication data packet, an identifier of a port and protocol used for transmitting the communication data packet, the application information of the application for receiving and sending the communication data packet, and the identifier of the protocol used for transmitting the communication data packet;
    determining whether the identification parameter exists in the event database;

if the identification parameter exists in the event database, declaring the network identifiable information matches the event database; and if none of the identification parameters exists in the event database, declaring the network identifiable information does not match the event database.

3. An industrial control system security analysis apparatus comprising:

a data acquisition module configured to collect a communication data packet from a first industrial control system of an OT network connecting the first industrial control system to a second industrial control system, wherein the communication data packet comprises interactive data transmitted between control devices in the first industrial control system;

an information extraction module configured to extract network identifiable information from the communication data packet collected by the data acquisition module, wherein the network identifiable information identifies at least one of a communication object, a communication rule, and a communication content;

a determination module configured to determine whether the network identifiable information extracted by the information extraction module matches a pre-created event database;

a first analysis module configured to declare the communication data packet is a malicious data packet if the determination module determines that the network identifiable information matches the event database;

a policy acquisition module configured to acquire security policies of the first industrial control system and the second industrial control system if the determination module determines that the network identifiable information matches the event database, wherein the security policies represent rules for processing a malicious data packet;

a second analysis module configured to determine a threat coefficient of the communication data packet for the second industrial control system according to the network identifiable information extracted by the information extraction module and each of the security policies acquired by the policy acquisition module, wherein the threat coefficient represents a degree of threat of the communication data packet to the second industrial control system;

a device screening module configured to determine target control devices having a risk of being attacked by the communication data packet in the OT network according to the network identifiable information extracted by the information extraction module and the security policies acquired by the policy acquisition module;

a coefficient calculation module configured to determine a threat coefficient of the communication data packet for each of the target control devices determined by the device screening module respectively according to the network identifiable information acquired by the information extraction module;

an information sending module configured to send the threat coefficient determined by the coefficient calculation module for each of the target control devices to a manager; and a policy optimization module configured to generate optimization suggestions for optimizing at least one of the security policies acquired by the policy acquisition module according to the network identifiable information after receiving a confirmation instruction sent by the manager according to the threat coefficient sent by the information sending module for each of the target control devices.

4. The apparatus as claimed in claim 3, wherein the determination module comprises:

a parameter identification unit configured to acquire an identification parameter contained in the network identifiable information, wherein the identification parameters include at least one of the device asset information of the control device receiving and sending the communication data packet, the Internet protocol address of the control device receiving and sending the communication data packet, an identifier of a port and protocol used for transmitting the communication data packet, the application information of the application for receiving and sending the communication data packet, and the identifier of the protocol used for transmitting the communication data packet;

a parameter finding unit configured to determine whether the identification parameter acquired by the parameter identification unit matches the event database;

a first determination unit configured to determine that the network identifiable information is located in the event database when the parameter finding unit determines the identification parameter matches the event database; and a second determination unit configured to determine that the network identifiable information does not match the event database when the parameter finding unit determines that none of the identification parameters exists in the event database.

5. An industrial control system security analysis method comprising:

collecting a communication data packet from a first industrial control system, wherein the communication data packet comprises interactive data transmitted between control devices in the first industrial control system;

extracting network identifiable information from the communication data packet, wherein the network identifiable information identifies at least one of a communication object, a communication rule, and a communication content;

determining whether the network identifiable information matches a pre-created event database;

if the network identifiable information matches the event database, performing the following:

determining that the communication data packet is a malicious data packet;

acquiring security policies of the first industrial control system and a second industrial control system, wherein the security policies include rules for processing a malicious data packet; and determining a threat coefficient of the communication data packet for the second industrial control system based on the network identifiable information and each of the security policies, wherein the threat coefficient represents a degree of threat of the communication data packet to the second industrial control system;

wherein acquiring security policies of the first industrial control system and the second industrial control systems comprises:

for the second industrial control systems, acquiring the security policy from the firewall between the second industrial control system and the first industrial control system;

for each of the control devices in the first industrial control system, acquiring the security policy from the firewall of the control device; and for each of the control devices in the second industrial control system, acquiring the security policy from the firewall of the control device;

wherein determining a threat coefficient of the communication data packet for the second industrial control system according to the network identifiable information and each security policy comprises for one control device located in the second industrial control system, performing the following:

determining a first probability of the communication data packet passing the firewall between the second industrial control system and the first industrial control system according to the network identifiable information and a first security policy used for the firewall between the second industrial control system and the first industrial control system;

determining a second probability of the communication data packet posing a threat to the control device after passing the firewall between the first industrial control system and the second industrial control system according to the network identifiable information and a second security policy used for the firewall of the control device;

determining a threat coefficient component for the control device according to the first probability, the second probability, and an importance weight of the control device, wherein the importance weight is positively correlated with the importance coefficient of the control device in the second industrial control system; and for the second industrial control system, determining a threat coefficient of the communication data packet for each of the second industrial control systems according to the threat coefficient component for each control device in the second industrial control system.

6. An industrial control system security analysis apparatus comprising:

a data acquisition module configured to collect a communication data packet from a first industrial control system of an OT network connecting the first industrial control system to a second industrial control system, wherein the communication data packet comprises interactive data transmitted between control devices in the first industrial control system;

an information extraction module configured to extract network identifiable information from the communication data packet collected by the data acquisition module, wherein the network identifiable information identifies at least one of a communication object, a communication rule, and a communication content;

a determination module configured to determine whether the network identifiable information extracted by the information extraction module matches a pre-created event database;

a first analysis module configured to declare the communication data packet is a malicious data packet if the determination module determines that the network identifiable information matches the event database;

a policy acquisition module configured to acquire security policies of the first industrial control system and the second industrial control system if the determination module determines that the network identifiable information matches the event database, wherein the security policies represent rules for processing a malicious data packet; and a second analysis module configured to determine a threat coefficient of the communication data packet for the second industrial control system according to the network identifiable information extracted by the information extraction module and each of the security policies acquired by the policy acquisition module, wherein the threat coefficient represents a degree of threat of the communication data packet to the second industrial control system;

wherein the policy acquisition module comprises:

a first policy acquisition unit configured to acquire a security policy for the second industrial control system from a firewall between the second industrial control system and the first industrial control system;

a second policy acquisition unit configured to acquire a respective security policy for each of the control devices in the first industrial control system from the firewall of the control device; and a third policy acquisition unit configured to acquire the security policy for each of the control devices in the second industrial control system from the respective firewall of the control device;

wherein the second analysis module comprises:

a first calculation unit configured for a control device located in a second industrial control system to determine a first probability of the communication data packet passing the firewall between the second industrial control system where the control device is located and the first industrial control system according to the network identifiable information and a first security policy, wherein the first security policy is a security policy used for the firewall between the second industrial control system where the control device is located and the first industrial control system;

a second calculation unit configured for one of the control devices located in the second industrial control system to determine a second probability of the communication data packet posing a threat to the control device after passing the firewall between the first industrial control system and the second industrial control system where the control device is located according to the network identifiable information and a second security policy, wherein the second security policy is a security policy used for the firewall of the control device;

a third calculation unit configured for a control device located in the second industrial control system to determine a threat coefficient component for the control device according to an importance weight of the control device, the first probability determined by the first calculation unit, and the second probability determined by the second calculation unit, wherein the importance weight is positively correlated with the importance coefficient of the control device in the second industrial control system; and a fourth calculation unit configured to determine for the second industrial control system a threat coefficient of the communication data packet for the second industrial control system according to the threat coefficient component determined by the third calculation unit for each control device in the second industrial control system.

* * * * *